FIG. 3

INVENTOR.
CHARLES G. STANNARD
BY
ATTORNEYS

April 26, 1966

C. G. STANNARD 3,247,769

CARTON ERECTING MACHINE

Filed Aug. 14, 1963

INVENTOR.
CHARLES G. STANNARD

BY

ATTORNEYS

April 26, 1966   C. G. STANNARD   3,247,769
CARTON ERECTING MACHINE
Filed Aug. 14, 1963   7 Sheets-Sheet 6

INVENTOR.
CHARLES G. STANNARD

United States Patent Office 3,247,769
Patented Apr. 26, 1966

3,247,769
CARTON ERECTING MACHINE
Charles G. Stannard, Ramsey, N.J., assignor to Federal Paper Board Company, Inc., Bogota, N.J., a corporation of New York
Filed Aug. 14, 1963, Ser. No. 302,071
14 Claims. (Cl. 93—49)

This invention relates to machines for setting-up or erecting cartons from flat preglued carton blanks, and has for its object the provision of a machine which is advantageously applicable to the erection of the sides and ends of cartons, and effecting an interlocking of the sides and ends. The machine of the invention can be used to setup any carton having a construction amenable to the mechanical movements of the machine.

The machine of the invention will be described in relation to the setting-up of a type of carton having interlocking triangularly hollow side and end walls, and especially those formed of a single blank consisting of a central or bottom panel, similar opposite sides formed by longitudinal fold lines, panels and glue flaps, and similar opposite ends formed by transverse fold lines and panels. The side panels are folded to form hollow sloping tapering sides and ends which are also sloping and triangular in cross-section. The sides and ends include contiguous corner-forming elements which engage edge portions of each other to secure the sides and ends in an interlocked erected position. Heretofore it has not been possible to erect such cartons entirely by mechanical means.

The invention provides a machine which receives preglued flat blanks, for example, blanks having the glue flaps glued to the bottom panel for forming the cartons. The blanks are held in position on a flat supporting base of the machine. The machine includes similar side folding devices which move towards each other to turn the preglued sides up to their erected hollow triangular form. In sequence, end corner forming devices of similar construction lift the ends to their upright positions, fold their panels to the triangular form, and fold in the corner forming elements to interlock the ends to the sides.

The machine has a single driving unit which operates both the side folding devices, preferably simultaneously, and the corner forming and end erecting devices in sequence. The side folding devices include plate means for lifting and turning up the sides and engaging edge portions of the sides to hold them against the base during the turning operation. The pressure exerted on the side edges during the turning effects a separation of the overlying panels opening the sides into triangular cross-section, and holding them in position during the folding of the corner forming elements and erection of the ends. In the type of hollow wall carton described, the corner-forming elements are panels.

The corner forming panels at the junction of the ends and sides of the carton are folded into a bellows-like structure in erecting the sides and ends, and the machine includes fingers which fold the panels into the bellows structures and hold them while the ends are being erected and bent along fold lines and folded over the bellows structures to a final position where the end panels are snapped into end locking engagement with end portions of the side panels.

These and other novel features of the invention will be better understood with reference to the accompanying drawings in which.

Figures 6, 7, 8, 9, 10:
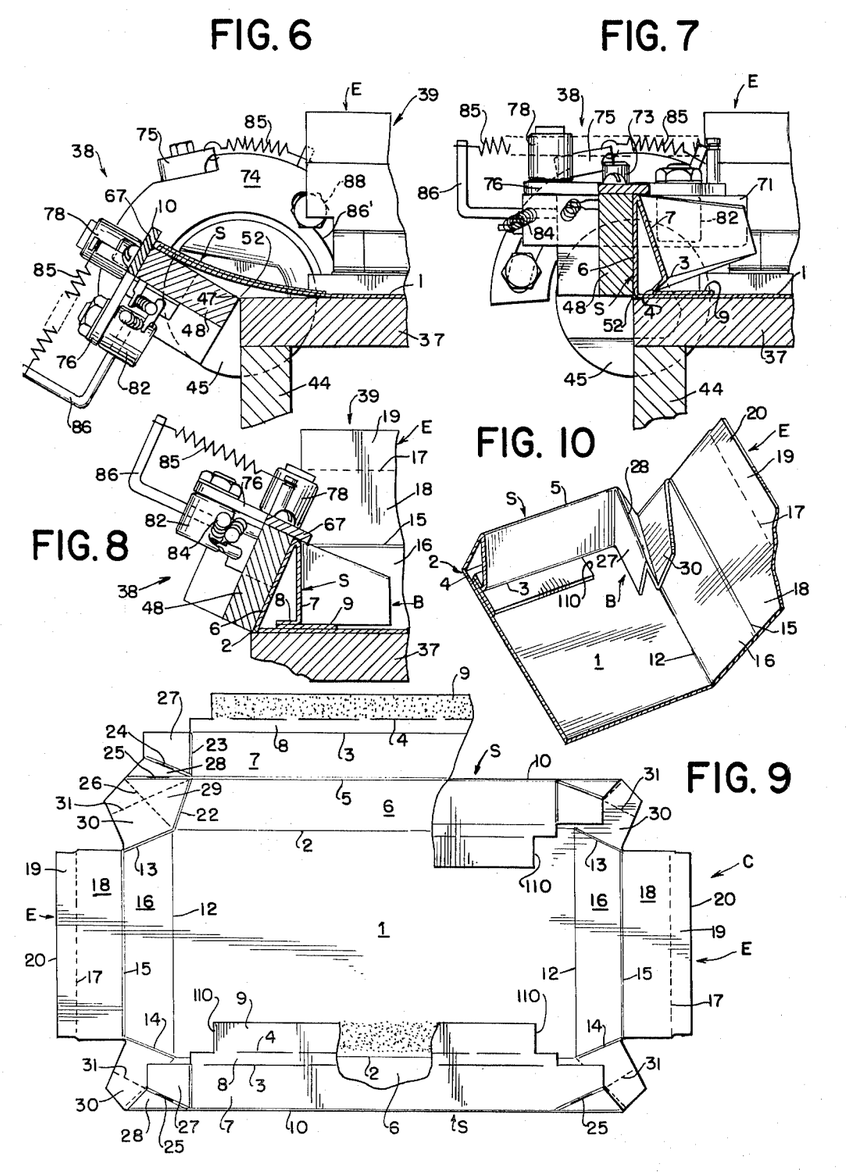
FIGS. 6, 7 and 8 are fragmentary sectional views of one of the side folders of the machine showing a sequence of operations.
FIG. 9 is a plan view of a preglued blank for a carton of the type previously described, with parts removed and parts extended.
FIG. 10 is a perspective view of a corner portion of the carton in a partly erected state.

The carton blank C of FIG. 9 is illustrative of a form of blank which can be set up in an operation of the machine of the invention. The blank has a bottom 1, opposite identical sides S, identical ends E and four corner forming elements or panels which fold into a bellows structure B. The side at the top is partly opened out for the purpose of illustration. The blank processed on the machine has both sides glued as shown at the foot of the drawing. Each side has solid crease fold lines 2 and 5 and weakened crease fold lines 3 and 4. Panel 6 is defined longitudinally by crease fold lines 2 and 5, panel 7 by fold lines 3 and 5, panel 8 by fold lines 3 and 4, and glue flap 9 extends from fold line 4. The panels are folded along fold line 5 to form edge 10 and glue flap 9 is glued to panel 1. Each end has a fold line 12 and fold lines 13, 14 and 15 defining panel 16 and weakened fold line 17 which, with fold line 15, forms panel 18. The end panel 19 extends from fold line 17 and has an edge 20.

Each corner portion of the blank portion between the sides and the ends has solid crease fold lines 13, 22, 23 and weakened fold lines 24, 25 and 26 which with the solid fold lines form panels 27, 28, 29 and 30. Panels 29 and 30 are traversed by a weakened fold line 31 which forms an angle with fold line 24 which is bisected by fold line 25. This line 31 facilitates folding the corner forming panels as will be described later. These panels, during the erection of the sides, are folded together bellows wise to form integral web-like self locking corners which are enveloped and held in place by the end panels of the carton in FIG. 10.

The machine of the invention illustrated in the drawings comprises a horizontal support 35 mounted on an angle iron frame generally designated as 36. A carton support or base 37, side folding devices 38 and end folding devices 39 are all supported on the horizontal support 35.

It will be seen from FIG. 1 that the side folding devices 38 are the same for erecting each side of the carton, and the end folding devices 39 are also identical and therefore only one of each of said devices will be described in detail.

Figure 1:
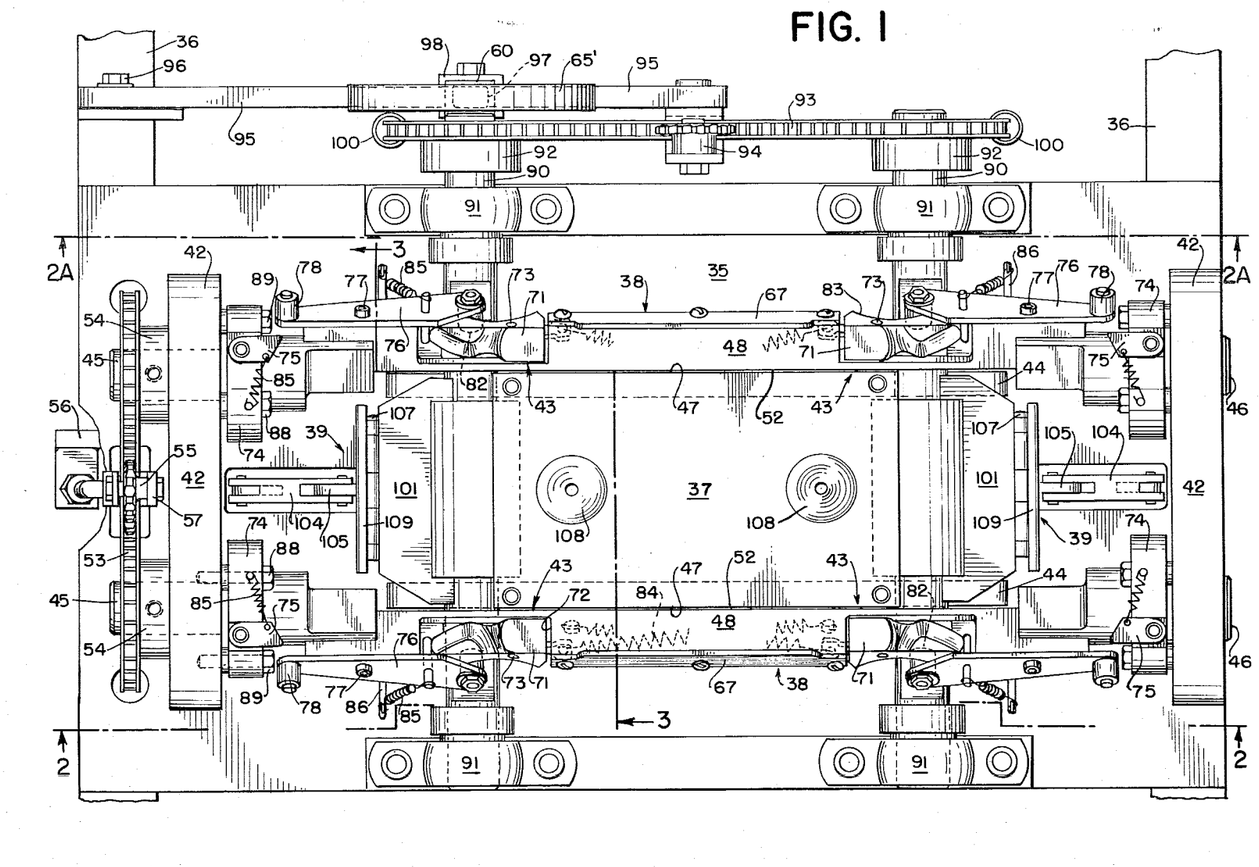
FIG. 1 is a plan view of the machine.
Figure 2:
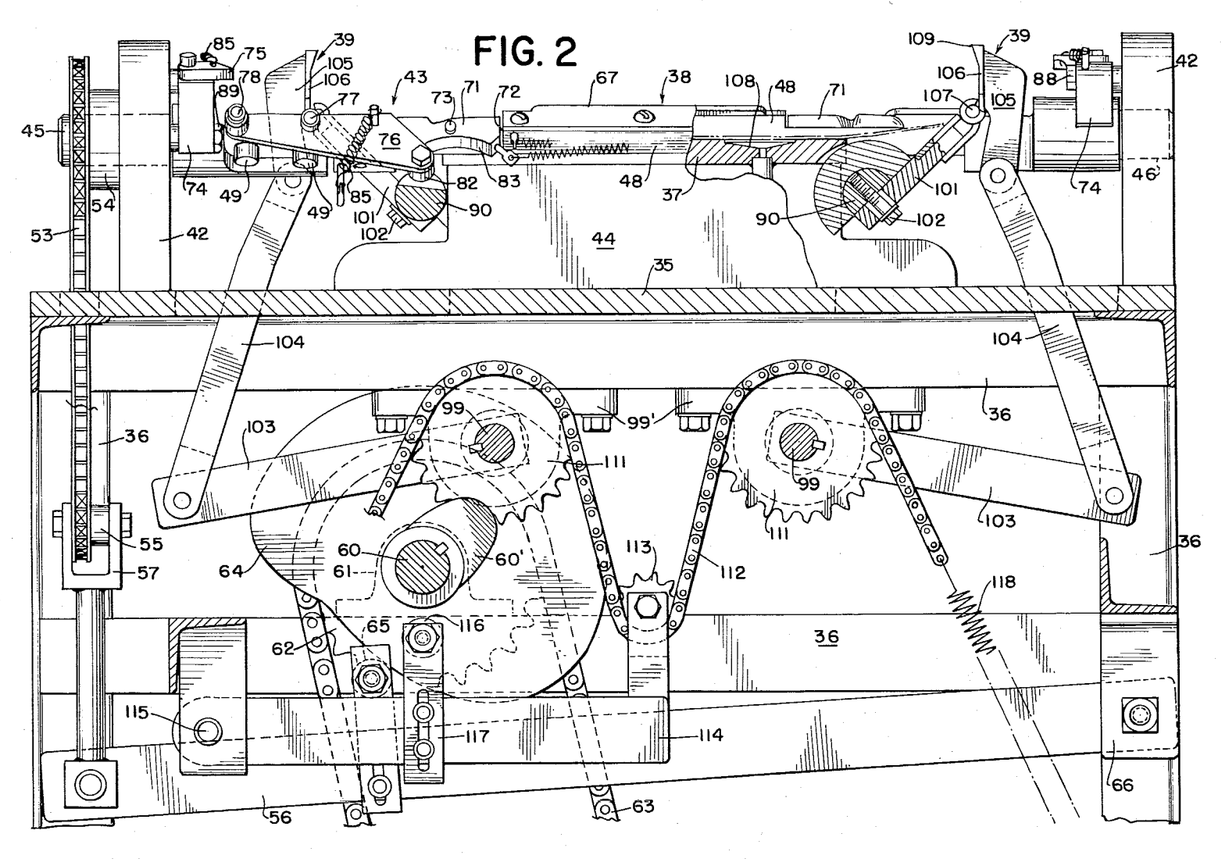
FIGS. 2 and 3 are horizontal sections on lines 2—2 and 3—3 respectively of FIG. 1.

As seen in FIGS. 1 and 2 the two parallel side folding devices 38 are supported by block members 42 rigidly mounted on support 35. Each side folding device 38 comprises two identical corner folding assemblies 43. The carton supporting base 37 is located between the side folding devices 38 and is fixed to supporting legs 44 which are in turn mounted on horizontal support 35. End tucker or folding devices 39 are located between the side folding devices 38 and at each end of base 37.

Each side folding device 38 comprises two stub shafts 45 and 46 which are positioned so that their centers of rotation 52 are coincident with the side edges 47 of the carton supporting base 37 (FIG. 6). A side folding bar 48 is mounted on the inside ends of each pair of the stub shafts 45, 46 by bolts 49 (FIG. 2). The edge 52 of each folding bar 48 is practically coincident wtih the carton fold line 2 (FIG. 8). The synchronized pivotal motion of the side folding bars 48 is accomplished through a chain 53 which is operatively attached to a sprocket 54 secured on each shaft 45 and a sprocket 55 the latter of which is fixed to the end of lever 56 by a yoke 57 (FIG. 2). A cam shaft 60 is mounted in pillow blocks 61 and is driven by a motor (not shown) through sprocket 62 and chain 63. Cam 64 is mounted on shaft 60 and operates lever 56 through an adjustable cam follower 65. Lever 56 is pivoted from bracket 66 mounted on the machine frame. As lever 56 is urged down by the cam 64 sprocket 55 and chain 53 are pulled down and both side folding devices 38 are pivoted inward, toward the center of the machine, as shown in FIGS. 6, 7 and 8. This motion causes the under side of bar 48 to bear on the under side of the side S of the carton and to turn both sides S into triangular cross-sectional form as shown in FIGS. 8 and 10. Retainer plates 67 on the bars 48 hold the outer edges 10 of the carton sides S during this pivotal operation in turning them from the position shown in FIGS. 6 and 7 to the final upright position shown in FIG. 8. This turning motion and pressure on the edge 10 and the location of the pivotal edge 52 in relation to the fold line 2 (FIG. 8) causes the outer and inner side panels 6 and 7 of the carton side S to spring apart as shown in FIG. 7. This springing apart is facilitated by pre-breaking the fold lines 3 and 4 when gluing the glue flap 9 of the carton blank.

Figure 4:
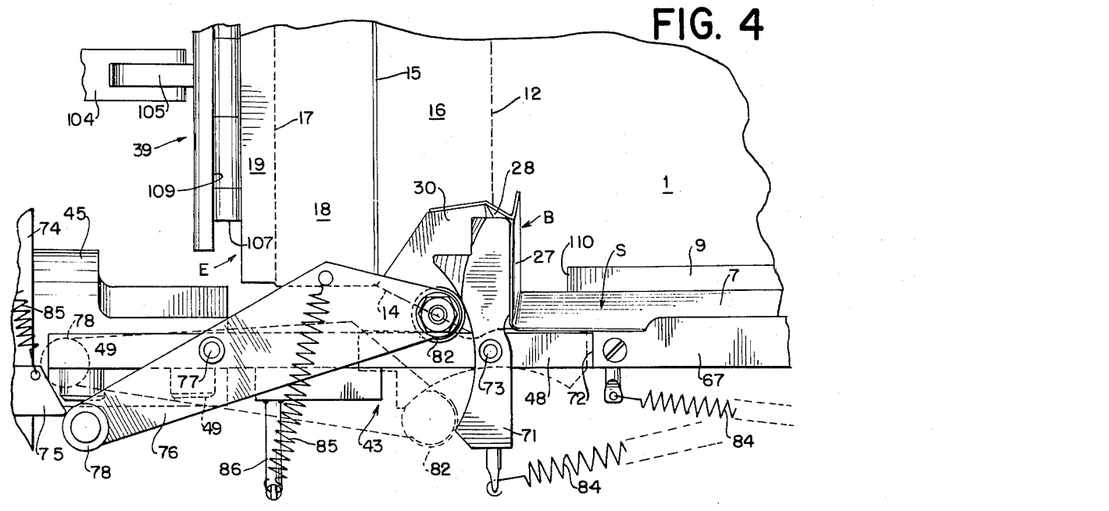
FIG. 4 is an enlarged plan view of one of the corner portions of the machine showing the corner folding device.
Figure 5:
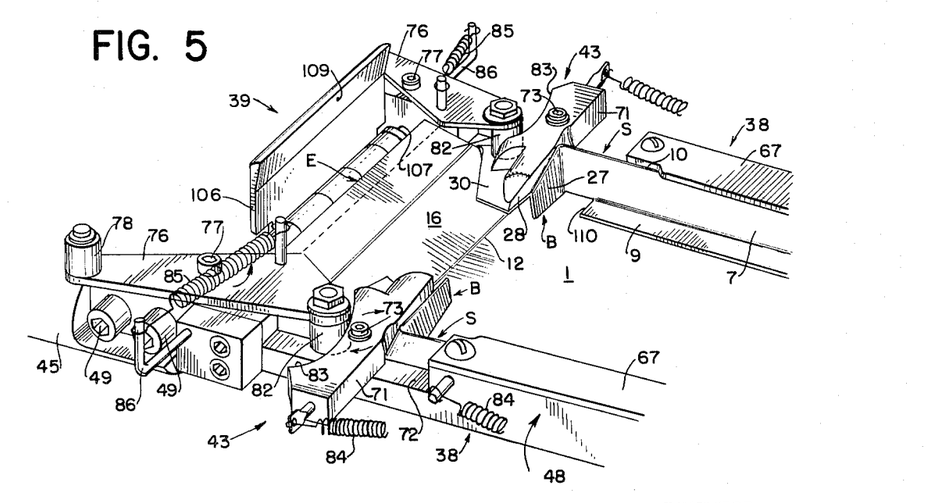
FIG. 5 is a perspective view of one end portion of the machine.

Each corner folder assembly 43 comprises a finger 71 mounted in a recess 72 in bar 48. Finger 71 is pivoted at 73 (FIG. 5). Mounted to the inside surface of support 42 are adjustable lever actuator holders 74 to each of which is mounted a pivoted lever actuator 75. Cam levers 76 are also pivoted from each folder bar 48 on the pins 77. A roller 78 is pivotally mounted on one end of cam lever 76 and is positioned to strike actuator 75 (FIG. 4) as the folder bar 48 moves to erect the sides of the carton. A second roller 82 is located on the opposite end of cam lever 76 and bears against cam surface 83 of finger 71. With reference to FIGS. 4 and 5 it will be seen that the cam roller carried by lever 76 in the direction of the arrow turns the finger 71 inwardly against the biasing spring 84 which turns the finger in the opposite direction when the roller 82 is not bearing on surface 83. The lever 76 has a biasing spring 85 mounted on an extension 86 which opposes the turning action of members 75 and 78. As illustrated in FIG. 4 the finger 71 is pivoted into the bellows portion B of the carton C when roller 78 strikes actuator 75 during the pivoting movement of folder bar 48. Before the final inward position of bar 48 is reached, lever 76 snaps over actuator 75 and both lever 76 and finger 71 return to their inoperative positions out of the path of the end folders 39, as shown in broken lines (FIG. 4).

The actuators 75 are pivotally mounted on holders 74 and are biased by springs 85 which enable them to be pushed to an out-of-the-way position when the lever 76 and cam roller 78 return.

Figure 3:
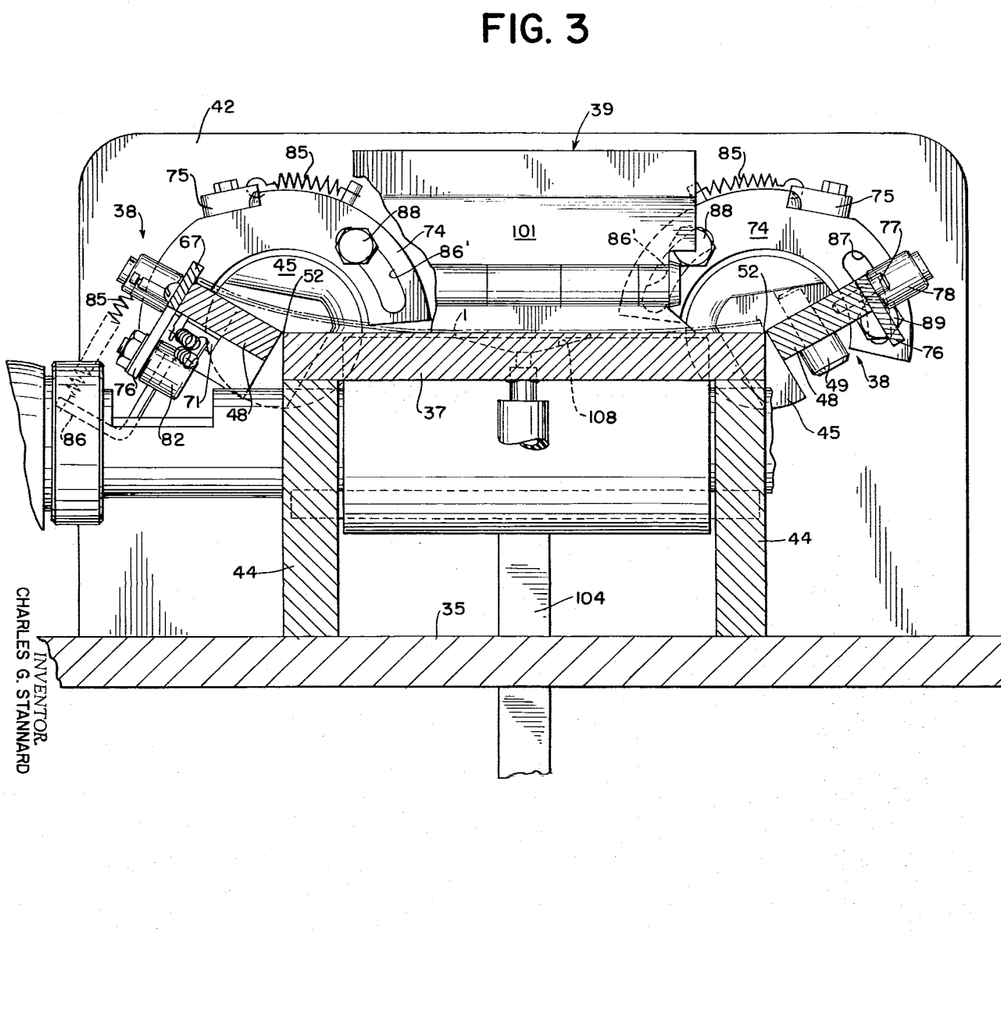

The holders 74 have arcuate slots 86' and 87 through which screws 88 and 89 secure them to the block members 42 (FIG. 3). By loosening these screws the holders may be turned to adjust the finger movement to proper timing.

Figure 2A:
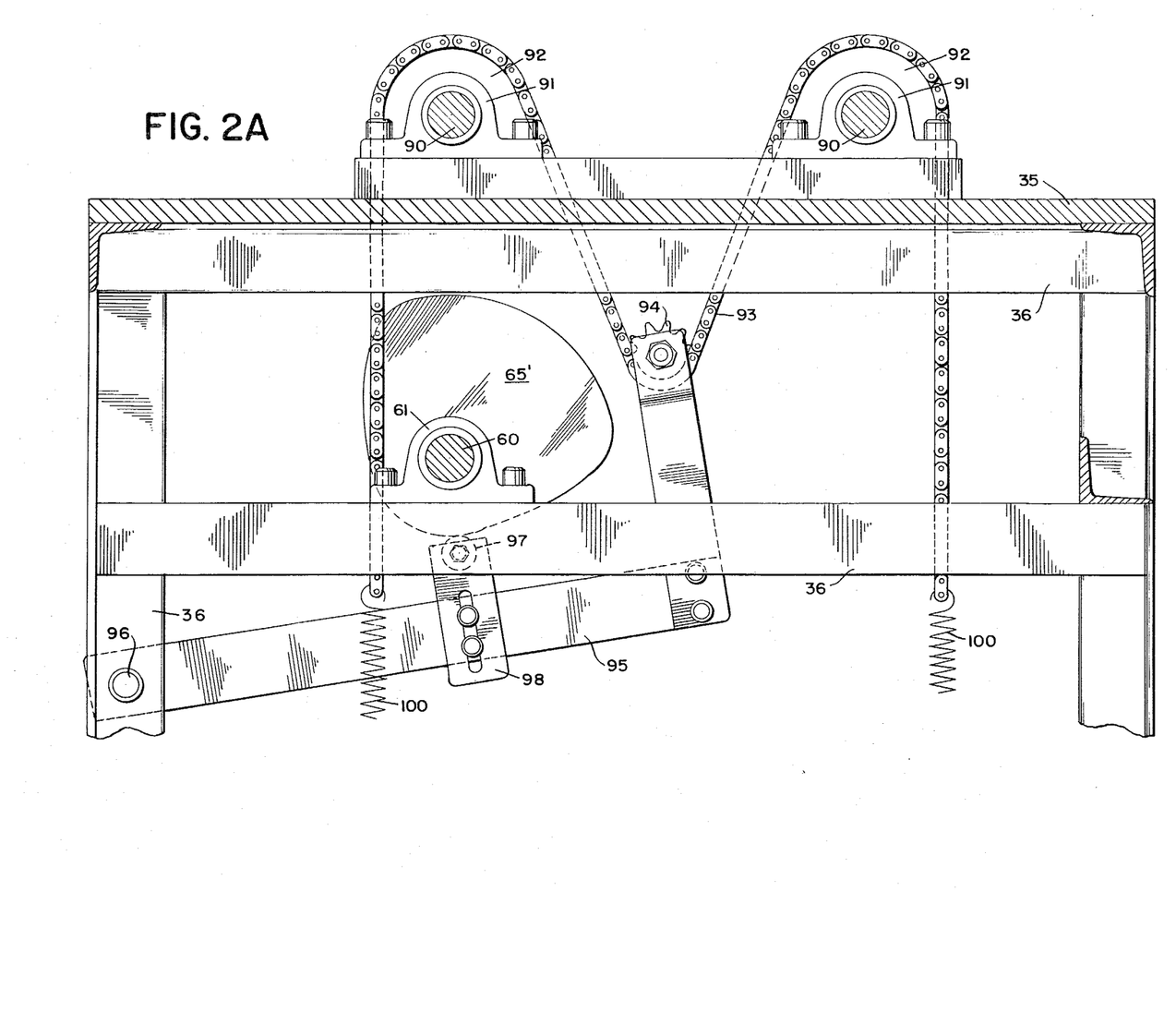
FIG. 2A is a side view taken at 2A—2A of FIG. 1.

The end folders or tuckers 39 as best shown in FIGS. 1, 2, 5, 11 and 12 each comprise a shaft 90 mounted in pillow blocks 91 (FIG. 1) above the top surface of support 35. Rotation of these shafts results from a pair of sprockets 92 mounted on the shafts 90, a chain 93 trained around the sprockets and engaging a third sprocket 94 which is fixed to a lever arm 95 in the same manner as the sprocket 55 is fixed to the lever 56 of the side folder device 38 (FIG. 2). Lever 95 is pivoted at 96 to the machine frame 36. A cam follower 97 is fixed to the lever 95 by an adjustable bracket 98 and is urged against a cam 65' by springs 100 attached to each end of chain 93. As the shaft 60 rotates and the cam 65' engages cam follower 97 and depresses the lever 95 this pulls the sprocket 94 downward and causes the chain 93 to turn both sprockets 92 and their shafts 90 towards each other to operate the end folding devices (FIG. 2A).

As best shown in FIG. 2 a pair of shafts 99 are mounted in pillow blocks 99' bolted to the frame 36 and positioned below support 35. Rotation of these shafts results from a pair of sprockets 111 mounted thereon, a chain 112 trained around the sprockets and engaging a third sprocket 113 which is mounted on a lever arm 114 in the same manner as the sprockets 55 and 94 are mounted on levers 56 and 95 respectively. Lever 114 is pivoted at 115 on the machine frame 36. A cam follower 116 is fixed to the lever 114 by an adjustable bracket 117 and is actuated by a cam 60' which is keyed to the shaft 60. Springs 118 are attached to the ends of chain 112 to hold the chain on the sprockets.

Figure 11:
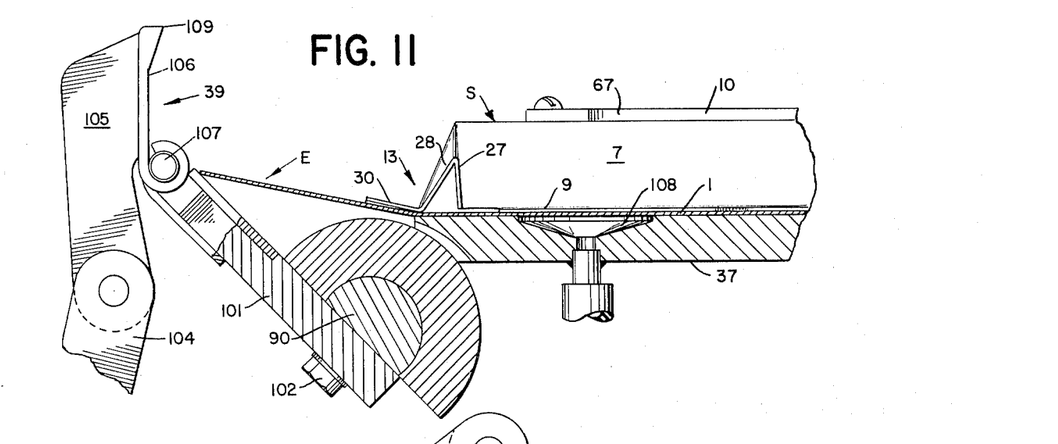
FIGS. 11 and 12 are sequential views of the end folding device of the machine.

The end folding devices 39 are mounted between side folding devices 38 and have a plate 101 on each shaft 90 secured as by bolts 102 (FIGS. 2, 5 and 11).

Figure 12:
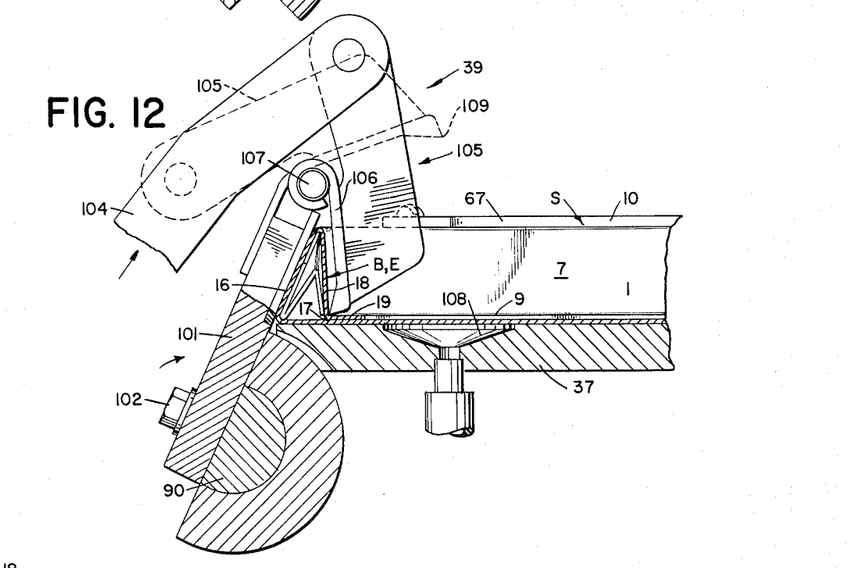
Figure 13:
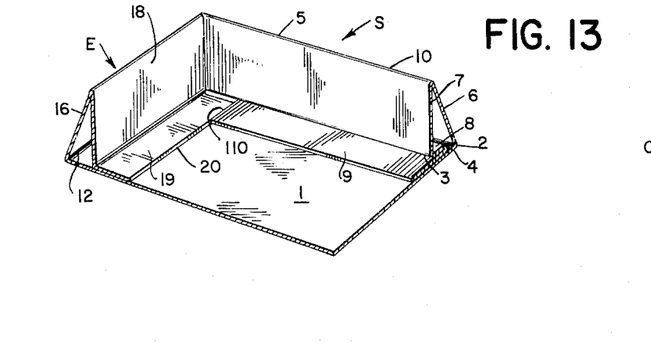
FIG. 13 is a perspective view of a corner portion of the completely erected carton.

As best shown in FIG. 2, the shafts 99 have levers 103 keyed thereto which are pivotally connected to links 104 which are pivotally connected through arms 105 to folding bars 106. The folding bars 106 of the end folding devices are pivotally connected by pins 107 to the plates 101. Each folding bar 106 has a nose edge 109 which bends and sharply folds the end panels and pushes the edge 20 of the end into locking engagement with the edge 110 of the side as shown in FIGS. 12 and 13. As best shown in FIGS. 11 and 12 the initial folding is carried out by the turning of the plate 101 attached to the shafts 90. When the plate 101 reaches a position just beyond the position shown in FIG. 11 the folding bar 106 swings into action. This action results as cam 60' strikes follower 116, depressing lever arm 114, which in turn rotates shafts 99. The links 103 and 104 cause plates 105 and 106 to bend the panels 18 and 19 into their locking position as shown in solid lines in FIGS. 12 and 13.

The operation of the erecting or set-up machine is as follows:

The carton blank C has the side fold lines broken and the glue flaps 9 glued to the bottom 1 in a previous operation and in a so-called preglued blank. The blank is positioned on the base 37 and it may, if desired, be held as by vacuum chambers 108 to keep the flat blank in a position wherein the fold lines 2 of the bottom panel 1 are substantially even with the edges 47 of base 37. The outer edges 10 of the flat blank are contained by plates 67. The fold lines 2 of the sides assume a position practically coincident with the axes 52 of the side folding device and as the devices turn and the extensions 67 bear on the edges 10 the side panels 6 and 7 flex apart. In other words, the sides move from the position of FIG. 6 to the position of FIG. 7 and then are finally opened as in FIG. 8. As the side folding devices turn inwardly and approach the vertical position, the fingers 71 are pivoted by the action of rollers 82 on the cam surfaces 83 to fold the panels of each corner into the bellows B (FIG. 5). In a previous operation, with reference to FIG. 9, the overlapping panels 28 and 29 were bent downward to break along weakened fold lines 31. As the fingers move into contact with panels 29 and press them inwardly, the prebroken fold lines 31 insure separation of the overlying panels 28 and 29. The outer end E is slightly above the horizontal plane of bottom panel 1 and the corner panels will remain in the partially folded position as shown in FIG. 5 until the end E is completely erected (FIG. 12). This erection of ends E is effected by the initial turning of all the panels 16, 18 and 19, from the position of FIG. 11, by the plates 101. At the intermediate position shown in broken lines (FIG. 12), the folding bars 106 swing with more rapid movement and the noses 109 engage the fold lines 17. As the motion continues, the end panels 19 are folded in as shown in FIGS. 12 and 13. When folding bars 106 complete the set-up of the ends E to their final upright positions they will have locked the ends of panel edges 20 behind panel edges 110 thus completing the last operation in the set-up of carton C.

I claim:

1. A machine for erecting the sides and ends of cartons formed of a single flat blank having panels for the sides and ends extending outwardly, said blank having the panels of the sides and ends foldable from a bottom panel along fold lines and said side panels having outer edges, said machine having a base on which the blank is placed, means for holding the blank, two similar side folding devices and two similar end folding devices, each side folding device being pivotally movable on an axis parallel to and substantially coincident with a fold line of the side, said side folding devices having means to engage the extended side and turn it to an erected position along the fold line, an extended edge on the folding device for engaging and holding the outer edge of the side while it is being turned, means for turning both side folding devices, each end folding device being pivotally mounted and located between the side folding devices and having means to turn them both to erect the ends, each side folding device including means to hold the side in its final upright position while both end folding devices turn to set the ends in their final upright positions, said end folding devices including means to turn the ends into locking engagement with the sides.

2. A machine as defined in claim 1 which comprises a shaft for each side folding device, a sprocket on each shaft and a chain on the sprockets operated by a cam to turn both devices towards and away from each other.

3. A machine as defined in claim 1 in which comprises a shaft for each end folding device, a sprocket on each shaft, a chain on the sprockets operated by a cam to turn the shafts towards and away from each other and sequentially in relation to the movement of the side folding devices.

4. A machine as defined in claim 1 which comprises pivoted fingers mounted on and operated by the turning of the side folding devices which turn inwardly bellows portions of the carton sides after the sides have been turned to their upright positions.

5. A machine for setting up the sides and ends of cartons from flat blanks which comprises a flat base for receiving and holding one blank having the sides and ends formed of panels which extend outwardly and are foldable along fold lines, a similar side folding device for each side being pivotally mounted with respect to the base and having its axis substantially coincident with a fold line of the side on which the side is turned to its erect position, means on the device for engaging the extended side of the carton which bears on the under surface and its outer edge, means for turning both side folding devices towards each other to turn the sides of the carton to their final upright positions and hold them, a similar end folding device for each end pivotally mounted with respect to the base, each end folding device having a bearing surface which engages the under surface of the end of the carton to turn it to its erected position, means on each end folding device to bend the ends of the carton along fold lines thereof and force an edge portion of each end into locking engagement with an edge portion of a side, and means in operative connection with the side folding devices to hold the erected sides and while so held to move the end folding devices to set the ends of the cartons in their final locked positions.

6. A machine as defined in claim 5 for erecting cartons having a plurality of corner panels between the sides and ends defined by fold lines, said panels, when folded over each other to a flat position, serving to stabilize each corner of the set-up carton, said machine having a finger in operative connection with an end of each side folding device which engages the corner panels to push them inwardly to a folded position after the side has been erected, and an end folding device including means to fold the ends over the corner panels.

7. A machine as defined in claim 5 for erecting cartons having ends formed of a plurality of panels defined by fold lines, said end folding device having a first pivoted member which engages the under surface of the end panels of the carton to turn them from their outwardly extended flat position to a partially erected position, and a second pivoted member on the end folding device operating in sequence with respect to the first pivoted member which engages the partially erected end panels of the carton to effect a further folding of the panels and the engagement of a terminal edge portion thereof with edge portions of the sides of the carton to secure the erected sides and ends in position.

8. A machine as defined in claim 7 which comprises power driven cams on a single shaft, one cam being operatively connected to the side folding devices and the other cam to the second pivoted member, said cams operating in sequence, first the side folding devices and then the second pivoted member after the end folding devices have partly erected the ends of the carton.

9. A machine for erecting the sides and ends of carton blanks having side panels, end panels and corner panels which comprises a support on which a blank is positioned, two side folding devices attached to the support, two end folding devices attached to the support means to turn both side folding devices inwardly to turn side panels of the blank to an erect position, means to turn both end folding devices after the side folding devices have been turned to turn the end panels to an erect position, a pivotal finger mounted on an end portion of each side folding device to turn corner panels of the carton to an inward position, means operatively connected with the side folding devices which turn the fingers and fold in the corner panels as the side panels reach their erect positions, and means to return the fingers to their initial positions.

10. A machine as defined in claim 9 which comprises a cam surface on each finger, a pivotal member on each side folding device having a cam-engaging part in operative engagement with the cam surface, and an actuator on the machine which engages the pivotal member to turn it and pivot the finger when the side folding device is turning to its upright position.

11. A device as defined in claim 10 which comprises spring means for tripping the actuator and spring means for returning the pivotal member when the side folding device is returned to its initial position.

12. A machine for erecting the sides and ends of carton blanks having side panels, end panels and corner panels which comprises a base on which a blank is positioned, two side folding devices attached to the base, two end folding devices attached to the base, means to turn both side folding devices inwardly to turn side panels of the blank to an erect position, means to turn both end folding devices after the side folding devices have been turned to fold the end panels to an erect position, a pivotal finger mounted on an end portion of each side folding device to turn corner panels of the carton to an inward position, means operatively connected with the side folding devices which turn the fingers and fold in the corner panels as the side panels reach their erect positions, means to return the fingers to their initial positions as the ends of the carton are erected, a double cam on a power driven shaft, one cam being in operative connection with the side folding devices, the other cam being in operative connection with a folding bar of the end folding devices, a third cam on the driven shaft in operative connection with shafts on which the end folding devices are turned, whereby the side folding devices, the fingers, the end folding devices and the end folding bars are operated in sequence in erecting the carton.

13. A machine for erecting the sides of cartons formed of a single flat blank having panels for the sides extending outwardly which join a bottom along longitudinal fold lines and have exterior edges, which comprises a flat base on which the blank is placed, two similar side folding devices each pivotally mounted on an axis coincident with one of the longitudinal fold lines of the blank, each device having a surface which engages a side to turn the side to its erected position, an edge-engaging means on each device against which an edge of one of the sides bears to hold the side on the base as the side is being turned to its erected position.

14. A machine as defined in claim 13 in which the flat base lies horizontally and the surfaces of the side-folding devices in their initial positions for receiving the blank extend upwardly at a small angle from the horizontal surface of the base, whereby the blank bottom as initially deposited lies on the base but the sides turn upwardly with their edges bearing on the edge-engaging means.

References Cited by the Examiner

UNITED STATES PATENTS

| | | | |
|---|---|---|---|
| 2,458,341 | 1/1949 | Cake | 93—49 |
| 2,682,210 | 6/1954 | Bivans | 93—49 |
| 2,710,566 | 6/1955 | Ahlmeyer et al. | 93—49 |
| 2,869,439 | 1/1959 | Wilcox | 93—49 |
| 2,882,803 | 4/1959 | Lloyd | 93—49 |
| 2,907,252 | 10/1959 | Owens | 93—49 |

FRANK E. BAILEY, *Primary Examiner.*